United States Patent
Pope et al.

(10) Patent No.: US 11,797,074 B2
(45) Date of Patent: Oct. 24, 2023

(54) MULTI-MODE INTEGRATED CIRCUITS WITH BALANCED ENERGY CONSUMPTION

(71) Applicant: Google LLC, Mountain View, CA (US)

(72) Inventors: Reiner Alwyn Pope, Sunnyvale, CA (US); Michial Allen Gunter, San Francisco, CA (US); Lukasz Lew, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 248 days.

(21) Appl. No.: 17/329,610

(22) Filed: May 25, 2021

(65) Prior Publication Data

US 2022/0382360 A1 Dec. 1, 2022

(51) Int. Cl.
 G06F 1/32 (2019.01)
 G06F 1/3234 (2019.01)
 G06F 15/80 (2006.01)

(52) U.S. Cl.
 CPC ........ G06F 1/3234 (2013.01); G06F 15/8046 (2013.01)

(58) Field of Classification Search
 CPC ..................................... G06F 1/32; G06F 1/15
 See application file for complete search history.

(56) References Cited

U.S. PATENT DOCUMENTS

2001/0021217 A1* 9/2001 Gunther .................. G06F 1/324
 374/178
2002/0087896 A1* 7/2002 Cline ...................... G06F 1/3203
 713/300
2003/0117175 A1* 6/2003 Green ................. H03K 19/0016
 326/93
2005/0120069 A1* 6/2005 Shankar ................ G06F 7/5235
 708/620
2007/0203967 A1 8/2007 Dockser
2019/0101952 A1 4/2019 Diamond et al.
2020/0142754 A1* 5/2020 Park ...................... G06F 9/4893

FOREIGN PATENT DOCUMENTS

WO 2017172120 A1 10/2017

OTHER PUBLICATIONS

Extended European Search Report for European Patent Application No. 22156571.6 dated Sep. 2, 2022. 13 pages.

(Continued)

*Primary Examiner* — Paul B Yanchus, III
(74) *Attorney, Agent, or Firm* — Lerner David LLP

(57) ABSTRACT

Aspects of the disclosure include methods, systems, and apparatus, including computer-readable storage media for multi-mode integrated circuits with balanced energy consumption. A method includes determining, by one or more processors and based at least on a maximum energy threshold for planned multi-mode system having one or more processing units, a respective number of operations that can be performed per clock cycle by the processing units for each operating mode. The system is configured to consume the same amount of energy per clock cycle in each operating mode, but perform more operations in operating modes corresponding to operations performed on smaller bit-width operands.

16 Claims, 4 Drawing Sheets

(56) References Cited

OTHER PUBLICATIONS

Poluri et al., "An Improved Router Design for Reliable On-Chip Networks," 2014 IEEE 28th International Parallel & Distributed Processing Symposium, 10 pages.

Pagliari et al., "Dynamic Bit-width Reconfiguration for Energy-Efficient Deep Learning Hardware," ISLPED '18: International Symposium on Low Power Electronics and Design, Jul. 23-25, 2018, Seattle, WA, USA. ACM, New York, NY, USA, 6 pages.

Metzgen et al., "A High Performance 32-bit ALU for Programmable Logic," FPGA'04, Feb. 22-24, 2004, Monterey, California, USA, 10 pages.

Hartmann, "Combined Scheduling and Data Routing for Programmable ASIC Systems," Institute of Computer Aided Design, Department of Electrical Engineering Technical University of Munich, W-800 Munich 2, Germany, [online] [retrieved Mar. 10, 2021]. Retrieved from the Internet: <URL:https://www.computer.org/csdl/pds/api/csdl/proceedings/download-article/12OmNrGb2gl/pdf>, (undated) 5 pages.

Zhu et al., "A Configurable Multi-Precision CNN Computing Framework Based on Single Bit RRAM," IEEE, 2019, 6 pages.

Gupta, "What's the Difference Between Single-, Double-, Multi- and Mixed-Precision Computing?", [online] [retrieved Mar. 11, 2021]. Retrieved from the Internet: <URL:https://blogs.nvidia.com/blog/2019/11/15/whats-the-difference-between-single-double-multi-and-mixed-precision-computing/>, Nov. 15, 2019, 35 pages.

\* cited by examiner

MULTI-MODE INTEGRATED CIRCUITS WITH BALANCED ENERGY CONSUMPTION

BACKGROUND

Processors can operate in a variety of different operating modes. Operating modes include modes in which a processor performs operations on operands of different sizes, or bit-widths. For example, a processor in a 16-bit operating mode performs operations on values in data each represented in 16 bits. As another example, a processor with a 32-bit operating mode performs operations on values represented in 32 bits. Processors can receive input to switch between operating modes.

A processor can perform one or more operations per clock cycle for the processor. The duration of a clock cycle for a processor depends on the clock speed of the processor. For example, a 1 gigahertz processor performs 1,000,000,000 clock cycles in a second.

An integrated circuit or chip fabrication system is a collection of hardware and software configured for fabricating integrated circuits according to provided specifications. The fabrication system receives data defining a design for a chip, and is configured to manufacture the chip according to the design.

BRIEF SUMMARY

Aspects of the disclosure provide for a multi-mode system that balances power consumption across different operating modes to perform different numbers of operations per mode and per clock cycle.

Aspects of the disclosure include a system including: one or more processing units configured to perform operations in a plurality of operating modes, wherein, for each operating mode, the one or more processing units are configured to perform, per clock cycle of the system, a respective number of operations corresponding to the operating mode, and wherein a first number of operations per clock cycle for a first operating mode of the plurality of operating modes consumes the same amount of energy to perform by the one or more processing units as a second number of operations for a second operating mode different from the first operating mode; and wherein the system is configured to cause each of the one or more processing units to perform a number of operations per clock cycle based on a number of operations for the current operating mode.

The foregoing and other aspects can include one or more of the following features, alone or in combination. For example, one implementation can include all of the following features in combination.

The amount of energy consumed for performing the first number of operations and the second number of operations by the one or more processing circuits is equal to the maximum amount of energy that can be provided to the system per clock cycle.

The system can further include a data routing unit configured to route data from an incoming stream of data to the one or more processing units, wherein a maximum amount of data that the data routing unit is configured to route per clock cycle is based on the amount of data necessary to perform the highest number of operations of the numbers of operations corresponding to the plurality of operating modes.

The amount of energy consumed for a number of operations corresponding to an operating mode is based at least on the amount of energy needed to route data to and from an processing unit in an operating mode, and the amount of energy needed to perform the operation by the processing unit using the routed data.

The system of claim 1, wherein each of the plurality of operating modes is a respective arithmetic operating mode for performing arithmetic operations by the one or more processing units on operands of a respective bit-width.

The bit-widths for the respective operating modes include one or more of 8-bits, 16-bits, 32-bits, and 64-bits.

The system can further include a data routing unit configured to route data from an incoming stream of data to the one or more processing units, wherein the maximum number of bits that can be routed by the data routing unit per clock cycle is based on the number of bits required to perform the number of operations for the operating mode corresponding to the lowest bit-width.

The data routing unit can be further configured to, for a processing unit operating in a first operating mode, route data for performing respective numbers of operations over a plurality of successive clock cycles that average out to the number of operations corresponding to the first operating mode.

The data routing unit is configured to gate the respective number of operations performed for each of the successive clock cycles according to a gating schedule for the first operating mode.

The respective number of operations for each operating mode performed per clock cycle increase non-proportionally for lower bit-widths.

The one or more processing units form at least a portion of a systolic array of processing elements.

Aspects of the disclosure are directed to a method for configuring a system of one or more processing units and a data routing unit, the method including: receiving, by one or more processors, a maximum energy threshold per clock cycle for the system; determining, by the one or more processors, the respective total amount of energy for executing an operation by the one or more processing units in each operating mode of a plurality of operating modes; determining, by the one or more processors and based at least on the maximum energy threshold, a respective number of operations that can be performed per clock cycle by the one or more processing units for each operating mode, wherein a first number of operations for a first operating mode causes the system to consume the same amount of energy per clock cycle as a second number of operations for a second operating mode; and causing the data routing unit to be configured to route data for the number of operations per clock cycle for a current operating mode when the system is set to the current operating mode.

Causing the data routing unit to be configured to route data per clock cycle for a current operating mode when the system is set to the current operating mode includes sending data specifying a configuration for the data routing unit to a device configured to fabricate the system including the data routing unit on a chip.

Causing the data routing unit to be configured to route data per clock cycle for a current operating mode when the system is set to the current operating mode includes: configuring the data routing unit of the system to route data for the number of operations per clock cycle for a current operating mode when the system is set to the current operating mode.

The amount of energy consumed by the one or more processing units in performing the first and second number of operations is equal to the maximum energy threshold.

The respective total amount of energy consumed for an operation in each operating mode is further based at least on the amount of energy needed to route data for input to a processing unit in the operating mode.

Each of the plurality of operating modes is a respective operating mode for performing operations by the one or more processing units on operands of a respective bit-width.

Configuring the data routing unit comprises configuring the data routing unit to route a maximum number of bits that can be routed by the data routing unit per clock cycle equal to the number of bits required to perform the number of operations for the operating mode corresponding to the lowest bit-width.

The method can further include: configuring the data routing unit to, for the one or more processing units operating in the current operating mode, route data for performing respective numbers of operations for a plurality of successive clock cycles that average out to the number of operations corresponding to the current operating mode.

The method can further include: configuring the data routing unit to gate the respective number of operations performed for each of the successive clock cycles according to a gating schedule for the first operating mode, when the one or more processing units are in the first operating mode.

Other implementations of these aspects include corresponding computer systems, apparatus, and computer programs recorded on one or more memory devices, each configured to perform the actions of the methods.

DETAILED DESCRIPTION

Overview

Figure 1:
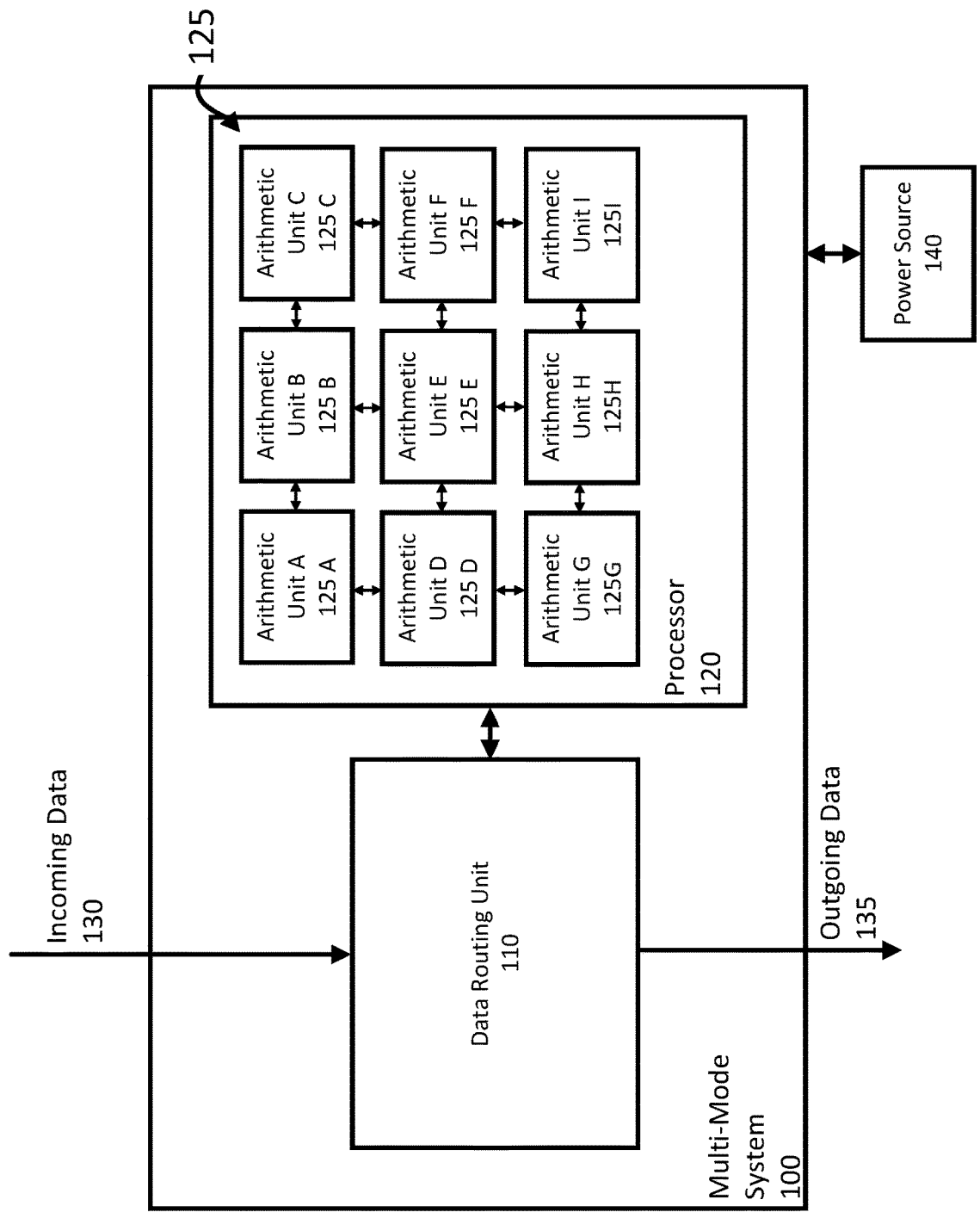
FIG. 1 is a block diagram of an example multi-mode system, according to aspects of the disclosure.

Aspects of the disclosure are directed to a system operating in different energy-balanced operating modes, and methods for configuring the system for energy-balanced multi-mode operation. A multi-mode system can include a processor and a data routing unit for routing data to and from the processor. The processor is configured to operate in a variety of different operating modes. The operating modes can include, for example, operating modes for performing operations on operands of particular bit-widths, such as 8-bit, 16-bit, 32-bit, or 64-bit operation. For example, the operations can be arithmetic operations. A system configured according to aspects of the disclosure can perform more operations per clock cycle while operating in modes at different bit-widths, to effectively use the maximum amount of energy available to the system at each clock cycle, according to a predetermined energy constraint.

Aspects of the disclosure provide for methods for configuring a system, such as a system-on-a-chip (SoC), based on identifying a respective number of operations that can be performed for each operating mode of the system. The respective number of operations per operating mode is based on an energy constraint specifying the maximum amount of energy that can be provided to the processor per clock cycle.

In previous approaches, the number of operations performed by a processor increased linearly in proportion with operating modes for lower bit-widths. For example, a processor configured to perform one operation per clock cycle in 64-bit mode can perform two operations in 32-bit mode, or four operations in 16-bit mode. Since the amount of data routed and processed is halved, such as from 64-bit to 32-bit mode, double the number of operations can be performed per clock cycle. If, as another example, the processor had a 16-bit mode, then it can perform four times the number of operations per cycle relative to 64-bit mode, because the data per operation in 16-bit is one-quarter of the amount of data per operation.

At least one drawback of this approach is that processors are often configured to consume the same amount of energy per clock cycle, regardless of the number of operations performed per cycle. One reason for this approach is because it is often cost-inefficient to configure a system to consume varying amounts of energy per clock cycle, depending on its current mode of operation. As a result, a processor wastes more energy per cycle in operating modes with lower bit-widths.

Aspects of the disclosure provide for a system for determining the number of operations that can be performed per clock cycle at a given mode of operation, such that the system uses all the energy available per clock cycle. In this way, the number of operations per cycle for operating modes with lower bit-widths can increase more than linearly, versus other approaches. The amount of energy consumed by the system can remain the same per cycle, but the throughput—measured in operations per clock cycle—can be higher relative to other approaches. Configuring a system as described herein can be particularly effective for systems that implement efficient data routing units, such as systems that include systolic arrays of processing elements configured for processing neural networks or other workloads. This is at least because more energy can be devoted for performing more operations by processing units of the processor, instead of being consumed routing data to the processor, or not being used at all.

A system can be fabricated, manufactured, or configured to route and process data relative to a target number of operations per clock cycle, based on the amount of energy consumed per operation by the processor in a given operating mode. Before the system is fabricated, the system can be planned according to a number of specifications for the design of the system. At least a portion of the design can relate to the maximum energy threshold for the system, e.g., the limit to how much energy is intended to draw per clock cycle of a processors of the system. The target number of operations is a number that causes the system to consume as close to the maximum energy threshold for the system per cycle, when in a given operating mode. As part of determining the target number of operations for a given operating mode, a configuration engine, for example implemented in a combination of hardware and/or software, can be configured to receive energy constraints for a planned multi-mode system, and generate the target number of operations for a given mode based at least on those constraints.

In some examples, as part of fabricating a chip including the system as described herein, the data routing unit for the system can be configured to route the amount of data necessary for performing the target number of operations per cycle for each operating mode available on the processor.

For example, if the system is configured to perform 2.667 operations per cycle in a given operating mode, the system can be configured to perform three operations per cycle for two cycles, and two operations for each third cycle, averaging out to 2.667 operations per cycle. The system can be configured to gate the number of operations per clock cycle to meet the target number of operations for each operating mode, even when the target number is not a whole number.

A chip fabrication system can receive data defining a design for a multi-mode system, and fabricate the multi-mode system, for example as a SoC, according to the design. The design can include data defining a configuration of a data routing unit, including a gating schedule for routing data for performing the target number of operations per cycle calculated for each operating mode. The chip fabrication system can also configure the data routing unit to be able to send the total amount of data required for performing the target number of operations for each of multiple operating modes. The data routing unit can be configured to send the amount of data for performing the highest target number of operations for one of the multiple operating modes. From the data defining the design, a chip fabrication system can generate a chip that maximizes operations per clock cycle while still operating within predetermined energy constraints.

Example Systems

FIG. 1 is a block diagram of an example multi-mode system, according to aspects of the disclosure. The multi-mode system 100 can include a data routing unit 110 and a processor 120. The multi-mode system 100 and its components, including the data routing unit 110 and the processor 120, can be implemented as one or more integrated circuits. As an example, the system 100 can be implemented as a system-on-a-chip (SoC), which can include a number of other components, such as memory and/or input/output connections. In other examples, the multi-mode system 100 can at least part of a chip that is installed or slotted into a computing device, such as a server computing device of a computing platform. The multi-mode system 100 can be one of multiple systems configured to communicate among one another, for example over a network. The network can connect the systems together through a combination of wired and wireless connections.

The data routing unit 110 can be implemented as one or more circuits and be configured to receive incoming data 130 to the system 100. In some examples, the data routing unit 110 can be a bypass network or a register file. The incoming data 130 can be data received as a stream and/or as a sequence of packets, batches, or other units of data. The incoming data 130 can be received from, for example, other components of a device implementing the system 100, such as memory. In other examples, the incoming data 130 is received from a component of a device implementing the system 100 and configured to receive network input from one or more other devices on the network.

The processor 120 can include one or more processing units, for example arithmetic units 125, including arithmetic units A-I 125A-I. A processing unit can include one or more circuits and be configured for receiving input for performing various types of operations, including routing, sorting, arithmetic or logic operations, such as multiplication, addition, bitonic mergesort, heapsort, quicksort, etc. Arithmetic units, such as the arithmetic units 125, can be one of a variety of different types of processing unit, configured to perform operations for processing input data to generate a corresponding output. Example arithmetic units include a multiplier circuit for performing multiplication on input operands, and circuits for performing fused-multiply-add operations. Although aspects of the disclosure described herein refer to arithmetic units, for example in FIG. 1, it is understood that in some examples other types of processing units configured to perform any of a variety of different types of operations can be implemented as part of the processor 120. Further, the processor 120 can include processing units of a variety of different types, including arithmetic units. Processing units can also include crossbars or other circuits configured for routing data.

The data routing unit 110 can be configured to route data to the arithmetic units 125. The data routing unit 110 and the arithmetic units 125 can be connected, for example by wires, pins, busses, or any form of circuit interconnect. For example, the data routing unit 110 can include separate wires for passing first and second operands to an arithmetic unit, and a third wire for receiving output from the arithmetic unit correspond to one or more operations performed on the first and second operands.

The arithmetic units 125 can form at least part of multiple processing elements for a systolic array, or any other arrangement of elements for the processor 120. Through the multiple arithmetic units, this example processor is configured for multi-mode operation, including 64-bit mode, 32-bit mode, 16-bit mode, and 8-bit mode. As described herein, a configuration engine can be configured for determining the number of operations that are performed in each of multiple operating modes. From the different numbers of operations, the configuration engine can determine what the maximum width of each wire or interconnect between the data routing unit 110 and an arithmetic unit has to be for supporting the number of operations for each clock cycle in a given operating mode. The width of the wire or interconnect refers to how much data the data routing unit can pass to and from the arithmetic unit in a given clock cycle.

The multi-mode system 100 can receive the incoming data 130, route and process the data using the data routing unit 110 and the processor 120, respectively, and generate output data 135. The output data 135 can be sent, for example, to another component of a device implementing the multi-mode system 100, and/or sent over a network to another device coupled to the system 100.

The multi-mode system 100 can perform varying numbers of operations per clock cycle of operation. An operation can be, for example, executing one or more instructions that the processor 120 is configured to perform, such as instructions from an instruction set for which the processor 120 is designed to execute, such as x86 instructions. As described in more detail herein, the number of operations that the multi-mode system 100 can perform per clock cycle is determined based on a predetermined energy constraint, representing the amount of power the arithmetic units 125 and the data routing unit 110 can draw from a energy source 140 per clock cycle.

The multi-mode system 100 can be connected to the energy source 140. The energy source 140 can be any source of energy, e.g., electrical energy, to the multi-mode system 100. In some examples, the energy source 140 can be a battery or a source of continuous electrical energy, such as from an outlet in which the device implementing the multi-mode system 100 is plugged into.

Components of the multi-mode system 100 consume energy to operate, and in this specification energy consumption is measured per clock cycle. For example, the system may consume, for each arithmetic unit 125A-I, 11 picojoules (pJ) per cycle. The total cost to operate an arithmetic unit per cycle can depend on both the energy cost to route the data to the arithmetic unit by the data routing unit 110, and the energy cost to perform an operation on the routed data by the arithmetic unit. As an example, the data routing unit may consume 1 pJ/cycle to route data for performing a 64-bit operation, and 10 pJ/cycle to perform the 64-bit operation. If all arithmetic units 125A-I are operating on a given clock cycle, the system can consume at least 99 picojoules per cycle (9 arithmetic units consuming 11 picojoules each, including energy draw from the data routing unit).

As described herein, the energy cost per-operation can be calculated, for example by a configuration engine, and the system 100 can be configured to perform the target number of operations per operating mode, such that the routing and operation energy costs for the target number of operations do not exceed the total amount of energy available to the system 100 per clock cycle.

The total amount of energy available, represented as a predetermined energy constraint, can be set according to a variety of different factors. For example, the constraint can be at least based on the materials from which the system 100 is built, for example based on their performance characteristics in conducting electricity and dissipating heat. As other examples, the constraint can be based on a fixed cost to manufacture the system 100, and/or the nature of the energy source from which the system 100 is expected to receive energy.

For example, the system 100 can be implemented on wearable or portable devices, such as smartwatches, tablets, or smartphones. In those examples, the system 100 may be restricted to a smaller maximum energy constraint, to reflect the constrained resources available on the device implementing the system 100. The constrained resources available may not only be reflected in the nature of a limited energy source such as a battery for a smartphone, but also in the physical footprint that the system 100 is budgeted to cover in the device. Physical constraints on the size and space of components of the system 100 can impact the amount of energy that the system can efficiently draw from an energy source per clock cycle, which in turn affects the overall maximum energy constraint imposed on the system 100.

The system 100 can be fabricated or manufactured by a chip fabrication system (not shown). A chip fabrication system is a collection of hardware and software configured for fabricating a chip, including, for example, cutting silicon wafers, preparing wafers for doping, doping the wafers, etching the wafers, and adding transistors and interconnects to the wafers. The chip fabrication system can also include software or hardware configured for simulating different load or use conditions for a fabricated or designed chip to be fabricated. In some examples, the system 100 implements at least a portion of a chip fabrication system as described herein.

A chip fabrication system can receive data specifying a design for a chip, for example data specifying a design for a chip implementing the system 100. As described herein, the data specifying the design can include the maximum width (in bits) of interconnects connecting the arithmetic units 125 to the data routing unit 110, as well as the configuration of the data routing unit 110 for routing data to and from the processor 120 equal to a target number of operations per operating mode available on the processor 120. The chip fabrication system can also configure the data routing unit according to a gating schedule that is included in the data specifying the design of the system 100. The gating schedule specifies how many operations' worth of data is routed to and from the processor 120 and the data routing unit 110, and is based on the target number of operations calculated for each operating mode available on the processor 120.

The chip fabrication system can receive data specifying the target numbers of operations for performing at a variety of different operating modes, and simulate a chip operating according to those target numbers. The chip fabrication system can run various tests, such as tests to measure capacitance and thermal characteristics of a chip, while the chip is operating at the specified target numbers. In this way, chip fabrication can be improved at least by aspects of the disclosure providing for computed target numbers that can be received as input by the chip fabrication for further testing and modification, in accordance with other potential hardware design constraints.

Figure 2:
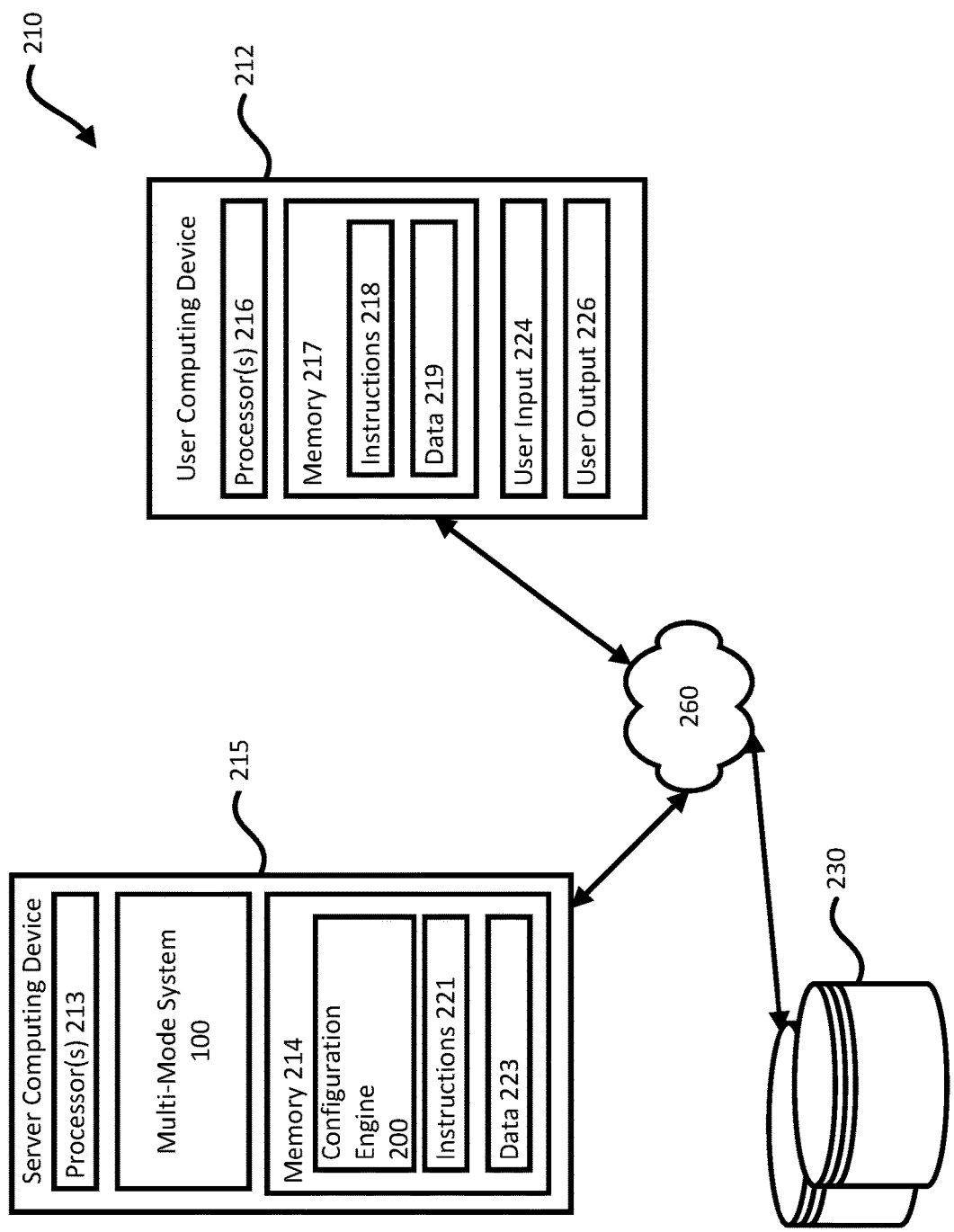
FIG. 2 is a block diagram of an example computing environment implementing a configuration engine and a multi-mode system, according to aspects of the disclosure.

FIG. 2 is a block diagram of an example computing environment 210 implementing a configuration engine 200 and the multi-mode system 100, according to aspects of the disclosure. User computing device 212 and the server computing device 215 can be communicatively coupled to one or more storage devices 230 over a network 260. The storage device(s) 230 can be a combination of volatile and non-volatile memory, and can be at the same or different physical locations than the computing devices 212, 215. For example, the storage device(s) 230 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 215 can include one or more processors 213 and memory 214. In some examples the server computing device 215 includes the multi-mode system 100, and does not include additional one or more processors 213. In those examples, the multi-mode system 100 can be configured to perform the functions of the one or more processors 213 described herein. The memory 214 can store information accessible by the processor(s) 213, including instructions 221 that can be executed by the processor(s) 213. The memory 214 can also include data 223 that can be retrieved, manipulated or stored by the processor(s) 213. The memory 214 can be a type of non-transitory computer readable medium capable of storing information accessible by the processor(s) 513, such as volatile and non-volatile memory. The processor(s) 213 can include one or more central processing units (CPUs), graphic processing units (GPUs), field-programmable gate arrays (FPGAs), and/or application-specific integrated circuits (ASICs), including tensor processing units (TPUs).

The instructions 221 can include one or more instructions that when executed by the processor(s) 213, causes the one or more processors to perform actions defined by the instructions. The instructions 221 can be stored in object code format for direct processing by the processor(s) 213, or in other formats including interpretable scripts or collections of independent source code modules that are interpreted on demand or compiled in advance. The instructions 221 can include instructions for implementing the configuration engine 200 consistent with aspects of this disclosure. The configuration engine 200 can be executed using the processor(s) 213, and/or using other processors remotely located from the server computing device 215.

The configuration engine 200 can be implemented on one or more devices having one or more processors in one or more locations, such as in server computing device 215. As described herein with reference to FIG. 4, the configuration engine 200 can be configured to cause a multi-mode system to be configured for energy-balanced multi-mode operation, according to aspects of the disclosure. In some examples, the configuration engine 200 is configured to generate data specifying at least part of a design for a multi-mode system, and send that data to a chip fabrication system (not shown) configured to fabricate the multi-mode system according to the design.

In other examples, the configuration engine 200 is configured to cause one or more components of a chip fabrication system to operate to fabricate a chip that includes the multi-mode system. While the configuration engine 200 and the multi-mode system 100 are shown as both implemented on the server computing device 215, in other examples the configuration engine 200 can be implemented using one or more processors on one or more devices in one or more locations that are not coupled to the multi-mode system 100.

The data 223 can be retrieved, stored, or modified by the processor(s) 213 in accordance with the instructions 221. The data 223 can be stored in computer registers, in a relational or non-relational database as a table having a plurality of different fields and records, or as JSON, YAML, proto, or XML documents. The data 223 can also be formatted in a computer-readable format such as, but not limited to, binary values, ASCII or Unicode. Moreover, the data 223 can include information sufficient to identify relevant information, such as numbers, descriptive text, proprietary codes, pointers, references to data stored in other memories, including other network locations, or information that is used by a function to calculate relevant data.

The user computing device 212 can also be configured similar to the server computing device 215, with one or more processors 216, memory 217, instructions 218, and data 219. The user computing device 212 can also include a user output 226, and a user input 224. The user input 224 can include any appropriate mechanism or technique for receiving input from a user, such as keyboard, mouse, mechanical actuators, soft actuators, touchscreens, microphones, and sensors. In some examples, the user computing device 212 provides data for processing by the multi-mode system 100, the data being received over the network 260. The user computing device 212 can be configured to receive output data corresponding to the input data sent to the multi-mode system 100.

The server computing device 215 can be configured to transmit data to the user computing device 212, and the user computing device 212 can be configured to display at least a portion of the received data on a display implemented as part of the user output 226. The user output 226 can also be used for displaying an interface between the user computing device 212 and the server computing device 215. The user output 226 can alternatively or additionally include one or more speakers, transducers or other audio outputs, a haptic interface or other tactile feedback that provides non-visual and non-audible information to the user of the user computing device 212.

Although FIG. 2 illustrates the processors 213, 216 and the memories 214, 217 as being within the computing devices 215, 212, components described in this specification, including the processors 213, 216 and the memories 214, 217 can include multiple processors and memories that can operate in different physical locations and not within the same computing device. For example, some of the instructions 221, 218 and the data 223, 219 can be stored on a removable SD card and others within a read-only computer chip. Some or all of the instructions and data can be stored in a location physically remote from, yet still accessible by, the processors 213, 216. Similarly, the processors 213, 216 can include a collection of processors that can perform concurrent and/or sequential operation. The computing devices 215, 212 can each include one or more internal clocks providing timing information, which can be used for time measurement for operations and programs run by the computing devices 215, 212.

The server computing device 215 can be configured to receive requests to process data from the user computing device 212. For example, the environment 210 can be part of a computing platform configured to provide a variety of services to users, through various user interfaces and/or Application Programming Interfaces (APIs) exposing the platform services. As an example, one or more services can be a machine learning framework or a set of tools for generating neural networks or other machine learning models according to a specified task and training data.

The devices 212, 215 can be capable of direct and indirect communication over the network 260. The devices 215, 212 can set up listening sockets that may accept an initiating connection for sending and receiving information. The network 260 itself can include various configurations and protocols including the Internet, World Wide Web, intranets, virtual private networks, wide area networks, local networks, and private networks using communication protocols proprietary to one or more companies. The network 260 can support a variety of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); or with a variety of communication standards, such as the LTE® standard for wireless broadband communication. The network 260, in addition or alternatively, can also support wired connections between the devices 212, 215, including over various types of Ethernet connection.

Although a single server computing device 215 and user computing device 212 are shown in FIG. 2, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Example Methods

Figure 3:
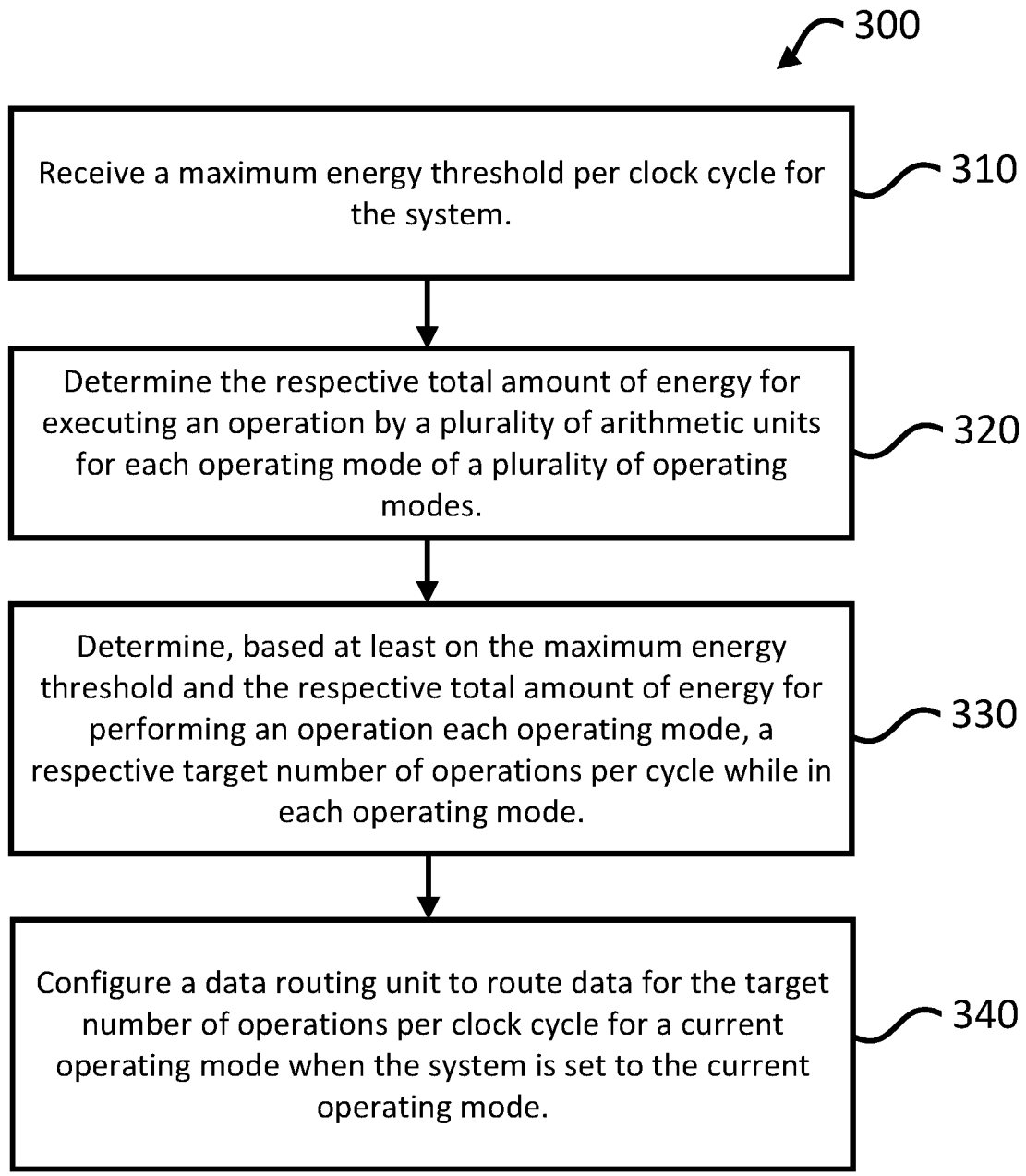
FIG. 3 is a flow chart of an example process for determining the number of operations to execute by the system for each of a plurality of operating modes, according to aspects of the disclosure.

FIG. 3 is a flow chart of an example process 300 for determining the number of operations to execute by the system for each of a plurality of operating modes, according to aspects of the disclosure. For example, one or more processors implementing a configuration engine, such as the configuration engine 200 of FIG. 2, can perform the process 300. The configuration engine can be configured to perform the process 300 to generate data specifying a design for the multi-mode system, as described herein with reference to FIGS. 1-2.

The configuration engine receives a maximum energy threshold per clock cycle for the system, according to block 310. As described herein with reference to FIG. 1, the maximum energy threshold can be according to one or more factors related to the design of the multi-mode system. The configuration engine can also receive data specifying the data routing and arithmetic units to be implemented as part of a multi-mode system.

For example, the configuration engine can receive data that specifies the amount of energy each arithmetic unit and the data routing unit is expected to consume per clock cycle, which can be a fraction of the maximum energy threshold.

In examples in which the multi-mode system is expected to implement multiple arithmetic units at different operating modes, the configuration engine can determine the target number of operations to perform per arithmetic unit.

The configuration engine determines the respective total amount of energy for executing an operation by a plurality of arithmetic units for the system, for each operating mode of a plurality of operating modes, according to block 320. In some examples, the configuration engine can receive the total amount of energy expected to be consumed for routing data and performing operations on each arithmetic unit.

For an example system operating in 64-bit mode, the cost to perform one operation per cycle on an arithmetic unit of the processor can be 11 picojoules (pJ) per cycle. Assume for purposes of this example that the maximum amount of energy (or maximum energy threshold) that the system consumes is 11 pJ/cycle, for a single arithmetic unit. Although calculations and examples provided herein focus on determining the number of operations to perform in a given operating mode for a single arithmetic unit, the examples herein can be scaled according to the number of arithmetic units implemented by the system. In examples in which the system implements different types of arithmetic units, for example, units implementing different circuits that may consume different amounts of energy per clock cycle, the configuration engine can be configured to repeat the process 300 for each type of arithmetic unit. In other words, the configuration engine can be configured to determine a respective target number of operations for each type of arithmetic unit operating in various different modes.

The energy cost for the arithmetic unit to perform an operation can depend, for example, on the type of operation being performed. For purposes of illustration, consider the arithmetic unit to be a multiplier configured to multiply input operands. As an example, the energy cost for performing a multiplication can be proportional to the square of the bit-width (in other words, the cost to multiply each bit in a first operand with each bit in a second operand). The specific energy costs for data routing and performing operations can vary from implementation-to-implementation.

The cost to execute an operation can be distributed between the data routing energy cost to execute the operation, and the energy cost for the arithmetic unit receiving the data to execute the operation. As an example, the energy cost for routing data can be proportional to the number of bits routed per cycle. The per-cycle cost for the data routing unit can be represented as:

$$\text{data routing energy cost per cycle} = \text{routing energy cost per operation} * \text{number of operations per cycle} \quad (1)$$

The configuration engine can receive initial data specifying the energy cost for performing one operation in 64-bit mode on the system, and use that initial data to compute the per-bit energy cost expected on the system. The energy cost per bit for routing can be represented as:

$$\text{energy cost per routed bit} = \frac{\text{energy cost of data routing unit per operation}}{\text{bits routed per operation}} \quad (2)$$

In the above example, if a processor performs one 64-bit operation per cycle with the data routing system consuming 1 pJ/cycle, and the number of bits routed is 192 bits per operation (64 bits for the first operand, 64 bits for the second operand, and 64 bits for the output), then the data routing energy cost per-bit is $1/192$ pJ/cycle. From this calculation, the configuration engine can then compute the energy cost of operations in other operating modes. For example, the system in 32-bit mode is expected to route 96 bits (32 bits for the first operand, 32 bits for the second operand, and 32 bits for the product). Therefore, the per-operation cost in 32 bit mode is $1/192*96$, or 0.5 pJ/cycle.

When the arithmetic unit is performing multiplication, the energy cost for performing the multiplication can be proportional to the square of the bit-width of the operands being multiplied. The per-cycle cost to perform one or more operations on an arithmetic unit can be represented as:

$$\text{arithmetic unit energy cost per cycle} = \text{arithmetic energy cost per operation} * \text{number of operations per cycle} \quad (3)$$

As described herein, the arithmetic energy cost per operation can vary depending on the nature of the operation performed. In the case of b-bit multiplication (where b is the bit-width of the operands being multiplied), the arithmetic energy cost per operation can be represented as:

$$\text{arithmetic energy cost per operation} = \text{(per operation cost of 8 bit multiplication)} * \left(\frac{b}{8}\right)^2 \quad (4)$$

In this example, the per operation cost of 8 bit multiplication on the example system is known, but the arithmetic cost per-operation can be expressed based on a fixed value or another operation in which the energy cost is known, e.g., 4 bit operation.

The cost per operation can vary depending on the nature of the operation performed by the processing unit or arithmetic unit. For example, while the examples provided refer to multiplication operations having an energy cost that is quadratic in nature relative to the bit-width of the operands, aspects of the disclosure provide for determining target numbers of operations for any type of operation implemented by one or more processing units. In various examples, operation energy cost can be represented as any function of the length or complexity of the input operands.

The configuration engine determines, based at least on the maximum energy threshold and the respective total amount of energy for performing an operation in each operating mode, a respective target number of operations per clock cycle while operating in each operating mode, according to block 330.

The target number of operations for a given operating mode is the highest number of operations that can be performed in that operating mode per cycle, without exceeding the maximum energy threshold. In the example of a system that consumes 11 pJ/cycle for an arithmetic unit (including costs to route the data to and from the data routing unit), the target number of operations for a given operating mode is the highest number of operations that can be performed by the arithmetic unit that does not require more than 11 pJ/cycle to perform. The formula can be represented as:

$$\text{maximize number of operations per cycle, such that:} \\ \text{data routing unit energy cost per cycle} + \text{arithmetic unit energy cost per cycle} \leq \text{maximum energy threshold per cycle} \quad (5)$$

As the number of operations per cycle increases, the amount of energy required to route all of the necessary data for executing those operations increases, as well as the amount of energy required by the arithmetic unit to execute those operations. Because the respective energy costs can increase at different rates, the configuration engine can be implemented to determine the number of operations for each operating mode that maximizes the number of operations per cycle, according to formula (5), which compares the sum of the data routing unit energy cost per cycle as in (1) with the arithmetic unit energy cost per cycle as in (3), against the maximum energy threshold. The configuration engine can be configured to perform any of a variety of different optimization techniques for maximizing the number of operations, according to (5).

TABLE 1 shows energy costs per cycle for different operating modes, when the number of operations per cycle is scaled linearly with the bit-width corresponding to the operating mode.

TABLE 1

| Bit Mode | Operations/ Cycle | Total Cost/ Cycle | Data Routing Cost per Cycle | Arithmetic Unit Cost per Cycle | Energy Waste |
| --- | --- | --- | --- | --- | --- |
| 64 | 1 | 11 pJ | 1 pJ | 10 pJ | 0 pJ |
| 32 | 2 | 6 pJ | 1 pJ | 5 pJ | 5 pJ |
| 16 | 4 | 3.5 pJ | 1 pJ | 2.5 pJ | 7.5 pJ |
| 8 | 8 | 2.25 pJ | 1 pJ | 1.25 pJ | 8.75 pJ |

In TABLE 1, as the bit-width is reduced, the operations per cycle are doubled. Also in TABLE 1, the data routing cost and arithmetic unit costs per cycle follow formulas 1-3, described herein. For example, if one 64-bit operation can be performed per clock cycle, then two 32-bit operations can be performed, because the same amount of data is routed per cycle. Similarly, four 16-bit operations or eight 8-bit operations can be performed, as the amount of data routed for performing each number of operations is the same. Also in TABLE 1, the total energy cost per cycle reduces for lower bit-width operations.

As noted herein, often systems configured for processing in different operating modes will consume the same amount of energy per cycle and per arithmetic unit. Therefore, while the total energy cost is reduced for lower bit-modes even as the number of operations increases, the system may still be consuming a maximum energy threshold worth of energy per cycle, effectively wasting more energy for lower bit-widths. As shown in TABLE 1, 8-bit mode has potentially the highest waste of energy per cycle, at 8.75 pJ per cycle, even though 8 times more operations are performed per cycle relative to 64-bit mode.

TABLE 2, by contrast, shows how a multi-mode system with the same maximum energy threshold of 11 pJ/cycle, can be configured to perform more operations for lower bit-width operating modes, scaling better than linearly.

TABLE 2

| Bit-Mode | Operations/ Cycle | Total Cost/Cycle | Data Routing Cost per Cycle | Arithmetic Cost per Cycle |
| --- | --- | --- | --- | --- |
| 64 | 1 | 11 pJ | 1 pJ | 10 pJ |
| 32 | 3.667 | 11 pJ | 1.83 pJ | 9.17 pJ |
| 16 | 12.57 | 11 pJ | 3.14 pJ | 7.86 pJ |
| 8 | 39.11 | 11 pJ | 4.89 pJ | 6.11 pJ |

For each operating mode in TABLE 2, the data routing energy cost per cycle plus the arithmetic unit energy cost per cycle is equal to 11 pJ/cycle, the maximum energy threshold in this example. The "Operations/Cycle" column of TABLE 2 shows the target number of operations to perform per cycle, for each operating mode. Comparing TABLE 1 with TABLE 2, the system configured as described herein performs $$\frac{3.667}{2} = 1.83$$

times more operations than a system with only a linear increase in operations/cycle in 32-bit mode. The results are more pronounced for lower bit-width operating modes. For example, in 8-bit mode, the system corresponding to TABLE 2 performs $$\frac{39.11}{8} = 4.89$$

times more operations per cycle than the system corresponding to TABLE 1. In addition, because the total cost per cycle is 11 pJ, the system performs the target number of operations for each operating mode as shown, and consumes exactly the maximum energy threshold, increasing throughput over the linear approach shown in TABLE 1.

Returning to FIG. 3, the configuration engine configures a data routing unit to route data for the target number of operations per clock cycle for a current operating mode, when the system is set to the current operating mode, according to block 340. As described herein with reference to FIG. 4, the system can be configured to route data equal to the maximum number of bits necessary to perform the highest number of operations out of the different operating modes. In TABLE 2, in 8-bit mode, 39.11 operations are performed per cycle, which means each circuit interconnect or wire between the data routing unit and an arithmetic unit can be configured to accommodate that data requirement, by routing approximately 313 bits per cycle (rounded up, as 8*39.11=312.88).

Figure 4:
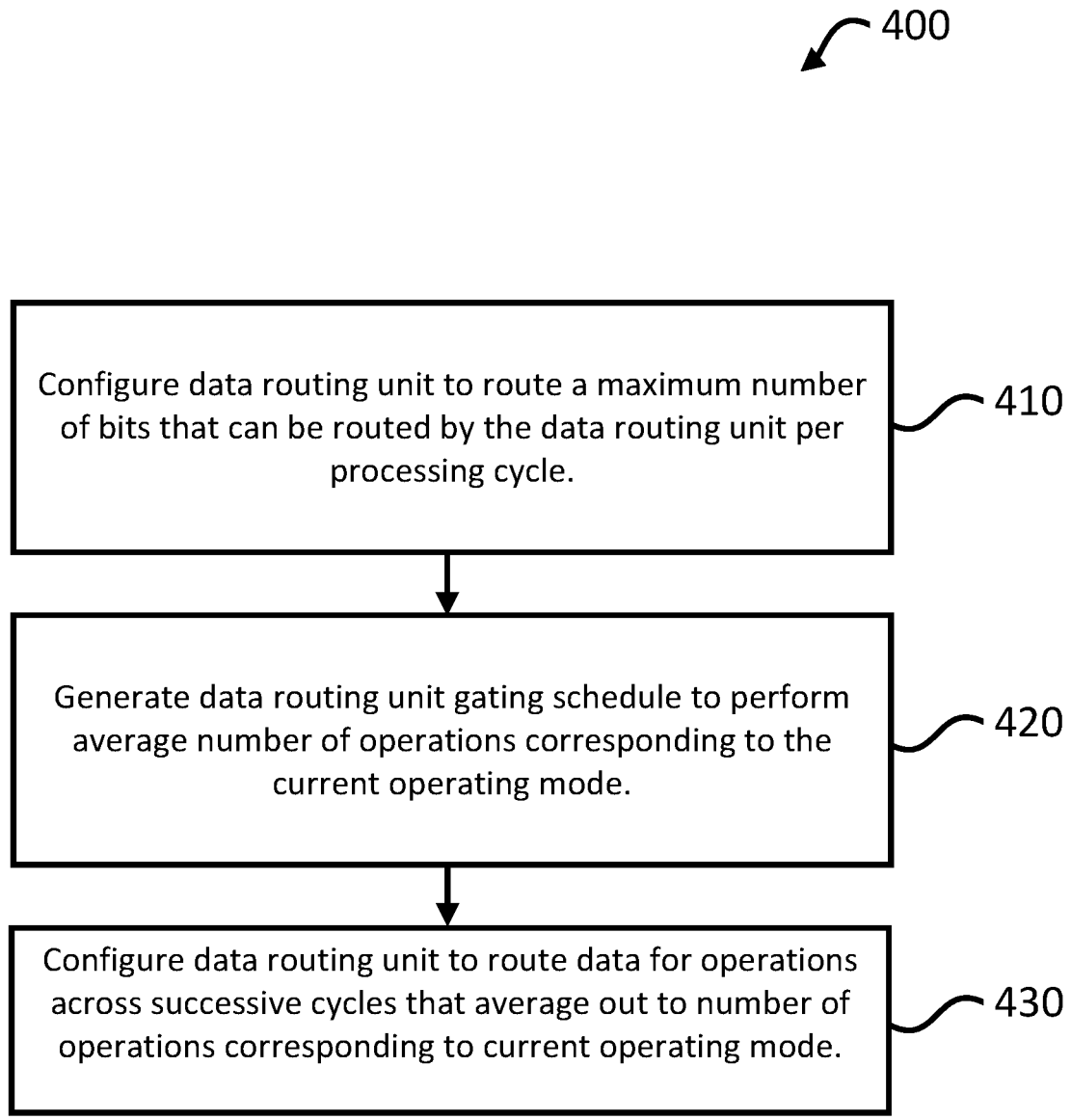
FIG. 4 is a flow chart of an example process for configuring the multi-mode system, according to aspects of the disclosure.

FIG. 4 is a flow chart of an example process 400 for configuring the multi-mode system, according to aspects of the disclosure. A configuration engine, such as the configuration engine 200 of FIG. 2, can perform the process 400. In some examples, the configuration engine is part of a chip fabrication system configured to fabricate chips implementing multi-mode systems according to data defining a design for the systems. In other examples, the configuration engine is implemented on one or more computing devices different from devices implementing a chip fabrication system, and is further configured to send data specifying at least part of a design for a multi-mode system to the chip fabrication system.

The configuration engine configures the data routing unit to route a maximum number of bits that can be routed by the data routing unit per clock cycle, according to block 410. As part of configuring the data routing unit, the configuration engine can identify the maximum amount of data the data routing unit has to route per cycle to an arithmetic unit. The maximum amount of data can be based on the target number of operations performed per cycle corresponding to the operating mode having the lowest bit-width.

TABLE 3

| Bit-Mode | Operations/Cycle | Bits Routed/Cycle |
| --- | --- | --- |
| 64 | 1 | 196 |
| 32 | 3.667 | ~352 bits |
| 16 | 12.57 | ~603 bits |
| 8 | 39.11 | ~938 bits |

TABLE 3, above, shows an average number of bits routed in different bit modes and according to different target numbers of operations. For example, in 8-bit mode, the system is configured to perform on average 39.11 operations per cycle. If each operation requires routing 24 bits (8 bits for the first operand, 8 bits for the second operand, 8 bits for the product), then the average number of bits routed per cycle is about 938 bits.

The exact number of bits can depend on the highest number of operations performed in a gating schedule that causes the multi-mode system to perform the identified number of operations per operating mode, on average. For example, if 32-bit was the lowest bit-width of the operating modes available on the multi-mode system, then from TABLE 2, the multi-mode system can be configured to perform 3.667 32-bit operations per clock cycle, on average. During execution, the system performs 4 operations per clock cycle for some cycles, and 3 operations per clock cycle in other cycles, which according to a gating schedule generated by the configuration engine, average out to 3.667 operations per cycle. Because 4 operations are performed per clock cycle for at least some clock cycles, the data routing unit is configured to route up to 384 bits per cycle (4 operations times 96 bits per operation).

The total amount of data routed can be divided by the number of wires or circuit interconnects between the data routing and an arithmetic unit performing the operations, for example one wire for the first input operand, a second wire for a second input operand, and a third wire for output from arithmetic unit receiving the first and second input operands.

As an example, the configuration engine can configure a multi-mode system according to block 410 by causing a chip fabrication system to fabricate a chip implementing the system with a data routing unit capable of routing the identified maximum amount of data. In other examples, the configuration engine sends data to a chip fabrication system, for example as part of data specifying a design for the multi-mode system. In turn, the chip fabrication system can fabricate a chip implementing the multi-mode system, according to the design.

The configuration engine generates a data routing unit gating schedule to perform the average number of operations corresponding to the current operating mode, according to block 420. For example, in TABLE 2, the example system is configured to perform, on average, 3.667 32-bit operations per clock cycle. To accommodate a non-integer number of operations, the data routing unit is configured to follow a gating schedule to gate data routed to an arithmetic unit, so that the arithmetic unit performs on average the target number of operations for the operating mode. In the example of 3.667 32-bit operations, the data routing unit can be configured to route data to perform four 32-bit operations per clock cycle for two clock cycles, followed by data to perform three 32-bit operations in a third clock cycle. Four operations in clock cycle 1 plus four operations in clock cycle 2 plus three operations in clock cycle 3 average out to 3.667 operations per clock cycle $$\left(\frac{4+4+3}{3} = \sim 3.666\right).$$

The configuration engine can generate a respective gating schedule for each operating mode. The configuration engine can send, to the chip fabrication system, the gating schedules for the multiple operating modes, as part of data defining a design for a multi-mode system. The gating schedules can be implemented on the data routing unit according to any technique for gating routed data.

The configuration engine configures the data routing unit to route data for operations across successive clock cycles that average out to the number of operations corresponding to a current operating mode, according to block 430. In some examples, the configuration engine can be coupled to a chip fabrication system configured to fabricate a chip with the system implemented on it and having a data routing unit following gating schedules generated by the configuration engine according to block 420. In other examples, the configuration engine sends data specifying the gating schedules to the chip fabrication system for later fabrication.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system, or be part of multiple systems. Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In

The invention claimed is:

1. A system comprising:
one or more processing units configured to perform operations in a plurality of operating modes, wherein each of the plurality of operating modes is a respective operating mode for performing arithmetic operations by the one or more processing units on operands of a respective bit-width,
wherein, for each operating mode, the one or more processing units are configured to perform, per clock cycle of the system, a respective number of operations corresponding to the operating mode,
wherein a first number of operations per clock cycle for a first operating mode of the plurality of operating modes consumes the same amount of energy to perform by the one or more processing units as a second number of operations for a second operating mode different from the first operating mode;
wherein the system is configured to cause each of the one or more processing units to perform a number of operations per clock cycle based on a number of operations for the current operating mode; and
wherein the respective number of operations corresponding to the operating mode are determined by:
receiving a maximum energy threshold per clock cycle for the system,
determining a respective total amount of energy for executing an operation by the one or more processing units in each operating mode of the plurality of operating modes based on an amount of energy needed to perform the operation, and an amount of energy needed to route data to and from a processing unit in the operating mode, and
determining based at least on the maximum energy threshold and the respective total amount of energy for executing an operation in each operating mode, the respective number of operations that can be performed per clock cycle by the one or more processing units for each operating mode, wherein the respective number of operations is a highest number of operations that can be performed per cycle for each operating mode without exceeding the maximum energy threshold.

2. The system of claim 1, wherein the amount of energy consumed for performing the first number of operations and the second number of operations by the one or more processing circuits is equal to the maximum energy threshold.

3. The system of claim 1,
wherein the system further comprises a data routing unit configured to route data from an incoming stream of data to the one or more processing units, wherein a maximum amount of data that the data routing unit is configured to route per clock cycle is based on the amount of data necessary to perform the highest number of operations of the numbers of operations corresponding to the plurality of operating modes.

4. The system of claim 1, wherein bit-widths for the respective operating modes comprise one or more of 8-bits, 16-bits, 32-bits, and 64-bits.

5. The system of claim 1,
wherein the system further comprises a data routing unit configured to route data from an incoming stream of data to the one or more processing units,
wherein the maximum number of bits that can be routed by the data routing unit per clock cycle is based on the number of bits required to perform the number of operations for the operating mode corresponding to the lowest bit-width.

6. The system of claim 5, wherein the data routing unit is further configured to, for a processing unit operating in a first operating mode, route data for performing respective numbers of operations over a plurality of successive clock cycles that average out to the number of operations corresponding to the first operating mode.

7. The system of claim 6, wherein the data routing unit is configured to gate the respective number of operations performed for each of the successive clock cycles according to a gating schedule for the first operating mode.

8. The system of claim 1, wherein the respective number of operations for each operating mode performed per clock cycle increase non-proportionally for lower bit-widths.

9. The system of claim 1,
wherein the one or more processing units form at least a portion of a systolic array of processing elements.

10. A method for configuring a system of one or more processing units and a data routing unit, the method comprising:
receiving, by one or more processors, a maximum energy threshold per clock cycle for the system;
determining, by the one or more processors, the respective total amount of energy for executing an operation by the one or more processing units in each operating mode of a plurality of operating modes based on an amount of energy needed to perform the operation, and an amount of energy needed to route data to and from a processing unit in the operating mode, wherein each of the plurality of operating modes is a respective operating mode for performing arithmetic operations by the one or more processing units on operands of a respective bit-width;
determining, by the one or more processors and based at least on the maximum energy threshold and the respective total amount of energy for executing an operation in each operating mode, a respective number of operations that can be performed per clock cycle by the one or more processing units for each operating mode, wherein the respective number of operations is a highest number of operations that can be performed per cycle in the operating mode without exceeding the maximum energy threshold, and wherein a first number of operations for a first operating mode causes the system to consume the same amount of energy per clock cycle as a second number of operations for a second operating mode; and
causing the data routing unit to be configured to route data for the number of operations per clock cycle for a current operating mode when the system is set to the current operating mode.

11. The method of claim 10, wherein causing the data routing unit to be configured to route data per clock cycle for a current operating mode when the system is set to the current operating mode comprises sending data specifying a configuration for the data routing unit to a device configured to fabricate the system comprising the data routing unit on a chip.

12. The method of claim 10, wherein causing the data routing unit to be configured to route data per clock cycle for a current operating mode when the system is set to the current operating mode comprises:

configuring the data routing unit of the system to route data for the number of operations per clock cycle for a current operating mode when the system is set to the current operating mode.

13. The method of claim 10, wherein the amount of energy consumed by the one or more processing units in performing the first and second number of operations is equal to the maximum energy threshold.

14. The method of claim 10, wherein configuring the data routing unit comprises configuring the data routing unit to route a maximum number of bits that can be routed by the data routing unit per clock cycle equal to the number of bits required to perform the number of operations for the operating mode corresponding to the lowest bit-width.

15. The method of claim 10, wherein the method further comprises:

configuring the data routing unit to, for the one or more processing units operating in the current operating mode, route data for performing respective numbers of operations for a plurality of successive clock cycles that average out to the number of operations corresponding to the current operating mode.

16. The method of claim 10, wherein the method further comprises:

configuring the data routing unit to gate the respective number of operations performed for each of the successive clock cycles according to a gating schedule for the first operating mode, when the one or more processing units are in the first operating mode.

* * * * *